US012092032B1

(12) United States Patent
Dudebout

(10) Patent No.: US 12,092,032 B1
(45) Date of Patent: Sep. 17, 2024

(54) GAS TURBINE ENGINE HYDROGEN SUPPLY SYSTEM AND METHOD

(71) Applicant: HONEYWELL INTERNATIONAL INC., Charlotte, NC (US)

(72) Inventor: Rodolphe Dudebout, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/329,041

(22) Filed: Jun. 5, 2023

(51) Int. Cl.
*F02C 7/224* (2006.01)
*F02C 3/22* (2006.01)
*F02C 7/232* (2006.01)

(52) U.S. Cl.
CPC ............. *F02C 7/224* (2013.01); *F02C 3/22* (2013.01); *F02C 7/232* (2013.01); *F05D 2240/36* (2013.01); *F05D 2260/213* (2013.01); *F05D 2260/606* (2013.01)

(58) Field of Classification Search
CPC .. F02C 3/22; F02C 7/222; F02C 7/224; F02C 7/232; F02C 7/30; F05D 2240/36; F23K 2300/203; F23K 2300/205
See application file for complete search history.

(56) References Cited

U.S. PATENT DOCUMENTS

| 11,493,175 | B2 | 11/2022 | Fairy |
| 2022/0145801 | A1 | 5/2022 | Gibson et al. |
| 2022/0381185 | A1 | 12/2022 | Muldoon et al. |
| 2023/0045911 | A1 | 2/2023 | Smith |

FOREIGN PATENT DOCUMENTS

| CN | 112242539 A | 1/2021 |
| KR | 101685853 B1 | 12/2016 |

*Primary Examiner* — Scott J Walthour
(74) *Attorney, Agent, or Firm* — Lorenz & Kopf LLP

(57) ABSTRACT

A system and method for supplying hydrogen to a combustor of a gas turbine engine includes supplying liquid hydrogen from a liquid hydrogen supply source to a hydrogen supply line that is adapted to be coupled to the combustor of the gas turbine engine. The liquid hydrogen is converted to gaseous hydrogen at a first pressure and is to a pump, which increases the pressure of the gaseous hydrogen to a second pressure. A flowrate of the gaseous hydrogen discharged from the pump is controlled using a fuel metering valve. A portion of the gaseous hydrogen discharged from the pump is received and stored in a high-pressure gaseous hydrogen tank, and a pressure-regulating valve maintains the second pressure at a substantially constant pressure magnitude.

7 Claims, 5 Drawing Sheets

GAS TURBINE ENGINE HYDROGEN SUPPLY SYSTEM AND METHOD

TECHNICAL FIELD

The present disclosure generally relates to gas turbine engines, and more particularly relates to a gas turbine engine hydrogen supply system.

BACKGROUND

Gas turbine engines may be used to power various types of vehicles and systems. A typical gas turbine engine includes at least a compressor, a combustor, and a turbine, and may include additional components and systems, depending on the particular end-use of the gas turbine engine. During operation of a gas turbine engine, the compressor draws in, and raises the pressure of, ambient air to a relatively high level. The compressed air from the compressor is then directed into the combustor, where a ring of fuel nozzles injects a steady stream of fuel. The fuel/air mixture is combusted, generating high-energy gas. The high-energy gas expands through the turbine, where it gives up much of its energy and causes the turbine to rotate. The gas is then exhausted from the turbine engine.

As may be appreciated, the gas that is exhausted from turbine engines may include various pollutants, such Carbon Dioxide ($CO_2$), a greenhouse gas. Thus, alternative fuels, such as hydrogen, are gaining interest as a way to reduce $CO_2$ emissions. As such there is increasing interest in developing a retrofit solution to convert liquid fuel fired turbine engines to gaseous fuel fired turbine engines or to develop turbine engines with dual-fuel capability. Thus far, liquid cryogenic storage is the only feasible approach to storing this fuel without incurring large volume penalties. This approach, however, has certain drawbacks. For example, the liquid hydrogen first needs to be heated/vaporized and compressed before being delivered to the gas turbine engine. To date, the systems and methods proposed to implement this functionality have been relatively complex and relatively expensive.

Hence, there is a need for systems and methods to heat/vaporize and compress liquid hydrogen for delivery to a gas turbine engine that is relatively simple and relatively inexpensive. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for supplying hydrogen to a combustor of a gas turbine engine includes a hydrogen supply line, an inlet heat exchanger, a pump, a fuel metering valve, a high-pressure gaseous hydrogen tank, and a pressure regulating valve. The hydrogen supply line includes a liquid hydrogen inlet and a gaseous hydrogen outlet. The liquid hydrogen inlet is adapted to receive liquid hydrogen from a liquid hydrogen supply source, and the gaseous hydrogen outlet is adapted to be coupled to the gas turbine engine. The inlet heat exchanger is disposed within the hydrogen supply line downstream of the liquid hydrogen inlet and is configured to transfer heat supplied from a heat source to the liquid hydrogen to thereby convert the liquid hydrogen to gaseous hydrogen at a first pressure. The pump is disposed within the hydrogen supply line downstream of the inlet heat exchanger. The pump is coupled to receive the gaseous hydrogen from the inlet heat exchanger and is configured to discharge the gaseous hydrogen at a second pressure that is higher than the first pressure. The fuel metering valve is disposed within the hydrogen supply line downstream of the pump and is configured to control a flowrate of the gaseous hydrogen discharged from the pump through the gaseous hydrogen outlet. The high-pressure gaseous hydrogen tank is disposed within the hydrogen supply line between the pump and the fuel metering valve. The high-pressure gaseous hydrogen tank is coupled to receive and store at least a portion of the gaseous hydrogen discharged from the pump. The pressure-regulating valve has an inlet and an outlet. The inlet is in fluid communication with the high-pressure gaseous hydrogen tank and the outlet is in fluid communication with the hydrogen supply line upstream of the pump. The pressure-regulating valve is operable to maintain the second pressure at a substantially constant pressure magnitude.

In another embodiment, a system for supplying hydrogen to a combustor of a gas turbine engine a hydrogen supply line, an inlet heat exchanger, a pump, a fuel metering valve, a vent line, and a purge valve. The hydrogen supply line includes a liquid hydrogen inlet and a gaseous hydrogen outlet. The liquid hydrogen inlet is adapted to receive liquid hydrogen from a liquid hydrogen supply source, and the gaseous hydrogen outlet is adapted to be coupled to the gas turbine engine. The inlet heat exchanger is disposed within the hydrogen supply line downstream of the liquid hydrogen inlet and is configured to transfer heat supplied from a heat source to the liquid hydrogen to thereby convert the liquid hydrogen to gaseous hydrogen at a first pressure. The pump is disposed within the hydrogen supply line downstream of the inlet heat exchanger. The pump is coupled to receive the gaseous hydrogen from the inlet heat exchanger and is configured to discharge the gaseous hydrogen at a second pressure that is higher than the first pressure. The fuel metering valve is disposed within the hydrogen supply line downstream of the pump and is configured to control a flowrate of the gaseous hydrogen discharged from the pump through the gaseous hydrogen outlet. The vent line has a vent line inlet and a vent line outlet. The vent line inlet is in fluid communication with a source of pressurized air, and the vent line outlet is in fluid communication with the hydrogen supply line downstream of the inlet heat exchanger. The purge valve is disposed within the vent line and is movable between a closed position, in which the vent line inlet is fluidly isolated from the vent line outlet, and an open position, in which the vent line inlet is in fluid communication with the vent line outlet.

In yet another embodiment, a method for supplying hydrogen to a combustor of a gas turbine engine includes supplying liquid hydrogen from a liquid hydrogen supply source to a hydrogen supply line that is adapted to be coupled to the combustor of the gas turbine engine. The liquid hydrogen is converted to gaseous hydrogen at a first pressure by transferring heat supplied from a heat source to the liquid hydrogen in an inlet heat exchanger that is disposed within the hydrogen supply line downstream. The gaseous hydrogen is supplied at the first pressure to a pump that is disposed downstream of the inlet heat exchanger. The pressure of the gaseous hydrogen is increased, using the pump, to a second pressure that is higher than the first pressure. A flowrate of the gaseous hydrogen discharged from the pump is controlled using a fuel metering valve disposed downstream of the pump. At least a portion of the gaseous hydrogen discharged from the pump is received and stored in a high-pressure gaseous hydrogen tank disposed between the pump and the fuel metering valve. The second pressure is maintained at a substantially constant pressure magnitude using a pressure-regulating valve having an inlet in fluid communication with the high-pressure gaseous hydrogen tank and an outlet in fluid communication with the hydrogen supply line upstream of the pump.

Furthermore, other desirable features and characteristics of the hydrogen supply system and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

With the above in mind, it should be noted that although the embodiments disclosed herein are described as being used to supply hydrogen to a gas turbine engine that is configured for use as an auxiliary power unit in an aircraft, it will be appreciated that the embodiments may be implemented in gas turbine engines that are configured to supply propulsion, electrical power, and/or pneumatic power in aircraft and non-aircraft environments.

Figure 1:
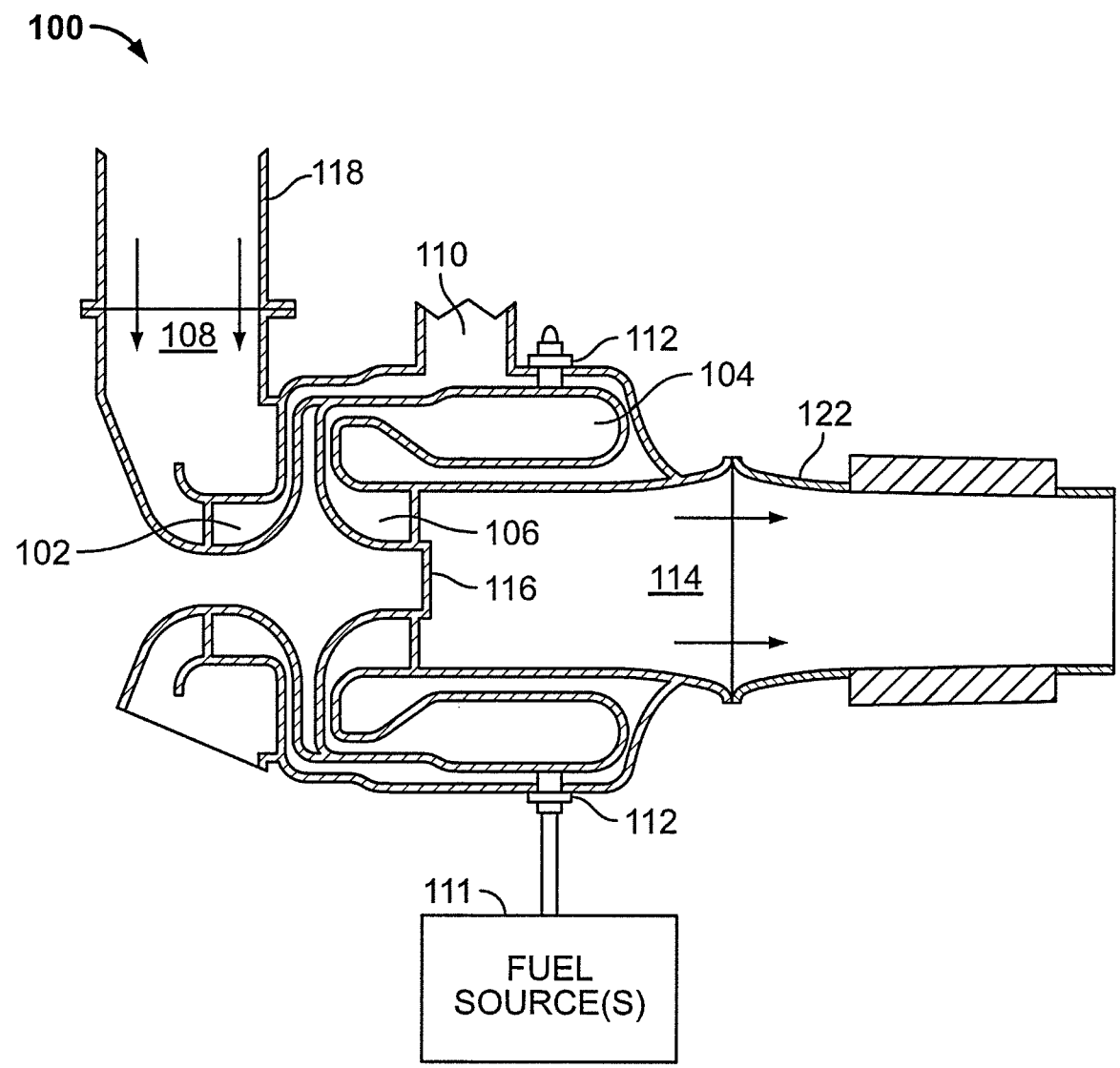
FIG. 1 depicts a simplified schematic cross section view of one embodiment of a gas turbine engine.

Turning first to FIG. 1, a simplified cross section view of an exemplary embodiment of a gas turbine engine 100 is depicted. The depicted gas turbine engine 100 is configured as an APU and includes a compressor 102, a combustor 104, and a turbine 106. Air is directed into the compressor 102 via an air inlet 108, which is coupled to an inlet duct 118. The compressor 102 raises the pressure of the air and supplies compressed air to both the combustor 104 and, in the depicted embodiment, to a bleed air outlet port 110.

In the combustor 104, the compressed air is mixed with fuel that is supplied to the combustor 104 from one or more fuel sources 111 via a plurality of fuel nozzles 112. The combustor 104 may be implemented as any one of numerous types of combustors now known or developed in the future. Non-limiting examples of presently known combustors include various can-type combustors, various reverse-flow combustors, and various through-flow combustors. No matter the particular combustor configuration 104 used, the fuel/air mixture is combusted, generating high-energy gas, which is then directed into the turbine 106.

The high-energy gas expands through the turbine 106, where it gives up much of its energy and causes the turbine 106 to rotate. The gas is then exhausted from the APU 100 via an exhaust gas outlet 114, which is coupled to an outlet duct 122. As the turbine 106 rotates, it drives, via a turbine shaft 116, various types of equipment that may be mounted in, or coupled to, the APU 100. For example, in the depicted embodiment the turbine 106 drives the compressor 102. It will be appreciated that the turbine 106 may also be used to drive a generator and/or a load compressor and/or other rotational equipment, which are not shown in FIG. 1 for ease of illustration. It will be appreciated that the turbine 106 may be implemented using any one of numerous types of turbines now known or developed in the future including, for example, a vaned radial turbine, a vaneless radial turbine, and a vaned axial turbine.

The one or more fuel sources 111 includes at least a gaseous fuel source that supplies a gaseous fuel. The gaseous fuel may be one of numerous gaseous fuels such as, for example, hydrogen, methane, propane, or ammonia, just to name a few. It will be appreciated that in some embodiments, the one or more fuel sources 111 may also include a liquidous fuel source that supplies a liquidous fuel. The liquidous fuel may be one of numerous liquidous fuels such as, for example, Jet-A fuel, or Sustainable Aviation fuel, just to name a few. In one particular implementation, the one or more fuel sources 111 is a hydrogen supply system that supplies gaseous hydrogen to the combustor 104. Various embodiments of such a hydrogen supply system now be described.

Figure 2:
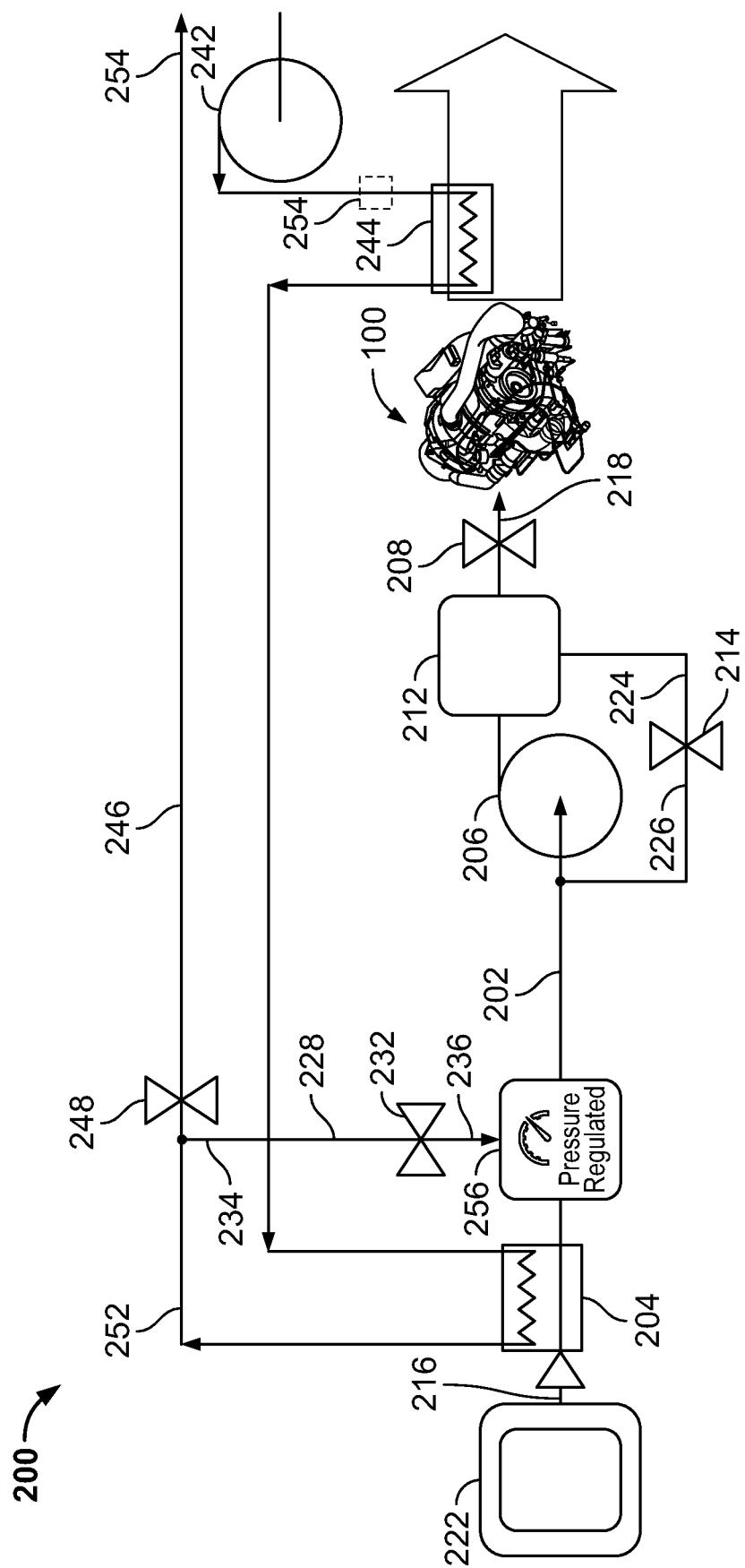
FIG. 2 depicts a functional schematic diagram of one embodiment of a hydrogen supply system that may be used to supply hydrogen to the combustor of the gas turbine engine of FIG. 1.

Referring now to FIG. 2, a functional schematic diagram of one embodiment of a hydrogen supply system 200 is depicted. The depicted system 200, which is used to supply hydrogen to the combustor 104 of the gas turbine engine 100, includes at least a hydrogen supply line 202, an inlet heat exchanger 204, a pump 206, a fuel metering valve 208, a high-pressure gaseous hydrogen tank 212, and a pressure-regulating valve 214.

The hydrogen supply line 202 includes a liquid hydrogen inlet 216 and a gaseous hydrogen outlet 218. The liquid hydrogen inlet 216 is coupled to receive liquid hydrogen from a liquid hydrogen supply source 222, such as a liquid cryogenic storage tank. The gaseous hydrogen outlet 218 is coupled to the gas turbine engine 100, and more particularly the combustor 104 in the gas turbine engine 100.

The inlet heat exchanger 204 is disposed within the hydrogen supply line 202 downstream of the liquid hydrogen inlet 216. The inlet heat exchanger 204 is configured to transfer heat supplied from a heat source (described further below) to the liquid hydrogen, thereby converting the liquid hydrogen to gaseous hydrogen at a first pressure. It will be appreciated that the inlet heat exchanger 204 may be implemented using any one of numerous types of heat exchangers. Some non-limiting examples of suitable heat exchangers include a finned tube heat exchanger, a shell and tube heat exchanger, or a plate heat exchanger, just to name a few. It will additionally be appreciated that the first pressure may vary and may depend, for example, on the size and configuration of the inlet heat exchanger 204 and the flow rate of the hydrogen.

The pump 206 is disposed within the hydrogen supply line 202 downstream of the inlet heat exchanger 204. The pump 206 is thus coupled to receive the gaseous hydrogen from the inlet heat exchanger 204 and is configured to discharge the gaseous hydrogen at a second pressure that is higher than the first pressure. It will be appreciated that the pump 206 may be implemented using any one of numerous types of pumps including, for example, any one of numerous types of centrifugal pumps or positive displacement pumps. It will additionally be appreciated that the second pressure (i.e., pump discharge pressure) may vary. In one exemplary embodiment, for example, the second pressure is about 300 psig.

The fuel metering valve 208 is disposed within the hydrogen supply line 202 downstream of the pump 206. The fuel metering valve 208 is configured to control the flowrate, through the gaseous hydrogen outlet 218, of the gaseous hydrogen that is discharged from the pump 206. More specifically, the fuel metering valve 208 provides a choked flow (i.e., relatively high pressure drop) from the second pressure to accommodate any compressibility effects between gas turbine operation and hydrogen supply system operation. The fuel metering valve 208 may be implemented using any one of numerous known types of metering valves including for example, various types of electrohydraulic servo valves (EHSVs), hydraulically-actuated valves, pneumatically-actuated valves, electromechanical actuated valves, and electrically-actuated valves, just to name a few.

The high-pressure gaseous hydrogen tank 212 is disposed within the hydrogen supply line 202 between the pump 206 and the fuel metering valve 208. The high-pressure gaseous hydrogen tank 212 is coupled to receive and store at least a portion of the gaseous hydrogen discharged from the pump 206. Thus, as may be appreciated, the high-pressure gaseous hydrogen tank 212 must be designed to withstand at least the second pressure.

The pressure-regulating valve 214 includes at least an inlet 224 and an outlet 226. The inlet 224 is in fluid communication with the high-pressure gaseous hydrogen tank 212, and the outlet 226 is in fluid communication with the hydrogen supply line 202 upstream of the pump 206. The pressure-regulating valve 214, which may be implemented using any one of numerous types of pressure-regulating valves, is operable to maintain the second pressure (i.e., pump discharge pressure) at a substantially constant pressure magnitude. The pressure-regulating valve 214 also ensures there is sufficient volume in the hydrogen supply line 202 to accommodate and decouple engine transients from any potential hydrogen fuel evaporation and/or compression.

When the hydrogen supply system 200 is no longer needed to supply hydrogen to the gas turbine engine 100, such as when the gas turbine engine is shutdown (or being shutdown), it is preferable that the hydrogen be vented/purged from the hydrogen supply system 200 and gas turbine engine 100. To facilitate this venting/purging, the system 200 may also include a vent line 228 and a purge valve 232. The vent line 228 has a vent line inlet 234 and a vent line outlet 236. The vent line inlet 234 is in fluid communication with a source of pressurized air (described further below), and the vent line outlet 236 is in fluid communication with the hydrogen supply line 202 downstream of the inlet heat exchanger 204.

The purge valve 232 is disposed within the vent line 228 and is movable between a closed position and a plurality of open positions. In the closed position, the vent line inlet 234 is fluidly isolated from the vent line outlet 236. Thus, the pressurized air source is fluidly isolated from the hydrogen supply line 202. In the open position, the vent line inlet 234 is in fluid communication with the vent line outlet 236. Thus, the pressurized air source is in fluid communication with the hydrogen supply line 202. As such, and as FIG. 2 depicts using flow arrows, air from the pressurized air source flows through hydrogen supply line 202 and the gas turbine engine 100, and thus purges the hydrogen therefrom.

The pressurized air source that is used to assist in purging the hydrogen from the hydrogen supply line 202 and the gas turbine engine 100 may vary and may depend on how the previously mentioned heat source is implemented. For example, in the embodiment depicted in FIGS. 1 and 2, the heat source is heat that is generated in the gas turbine engine 100 and the pressurized air source is an air pump 242. The air pump 242 is configured to receive air, at a first temperature, from the surrounding atmosphere, which may be, for example, an APU compartment or external environment, and to discharge the air at a discharge pressure. It will be appreciated that the air pump 242 may be implemented using any one of numerous types of air pumps including, for example, any one of numerous types of centrifugal air pumps or positive displacement air pumps. It will additionally be appreciated that the discharge pressure may vary.

As FIGS. 1 and 2 also depict, in this embodiment the heat that is generated in the gas turbine engine 100 is supplied from engine exhaust gas. More specifically, the system 200 in this embodiment includes an engine heat exchanger 244. The engine heat exchanger is coupled to receive the air discharged from the air pump 242 and is configured to transfer the heat generated in the gas turbine engine 100, and more specifically the heat in the engine exhaust gas, to the air. As such, the temperature of the air is increased from the first temperature to a second temperature. The heated air, at the second temperature, is then supplied to the inlet heat exchanger 204. As with the inlet heat exchanger 204, it will be appreciated that the engine heat exchanger 244 may be implemented using any one of numerous types of heat exchangers. Some non-limiting examples of suitable heat exchangers include a finned tube heat exchanger, a shell and tube heat exchanger, or a plate heat exchanger, just to name a few. It will additionally be appreciated that the second temperature may vary and may depend, for example, on the first temperature.

Figure 4:
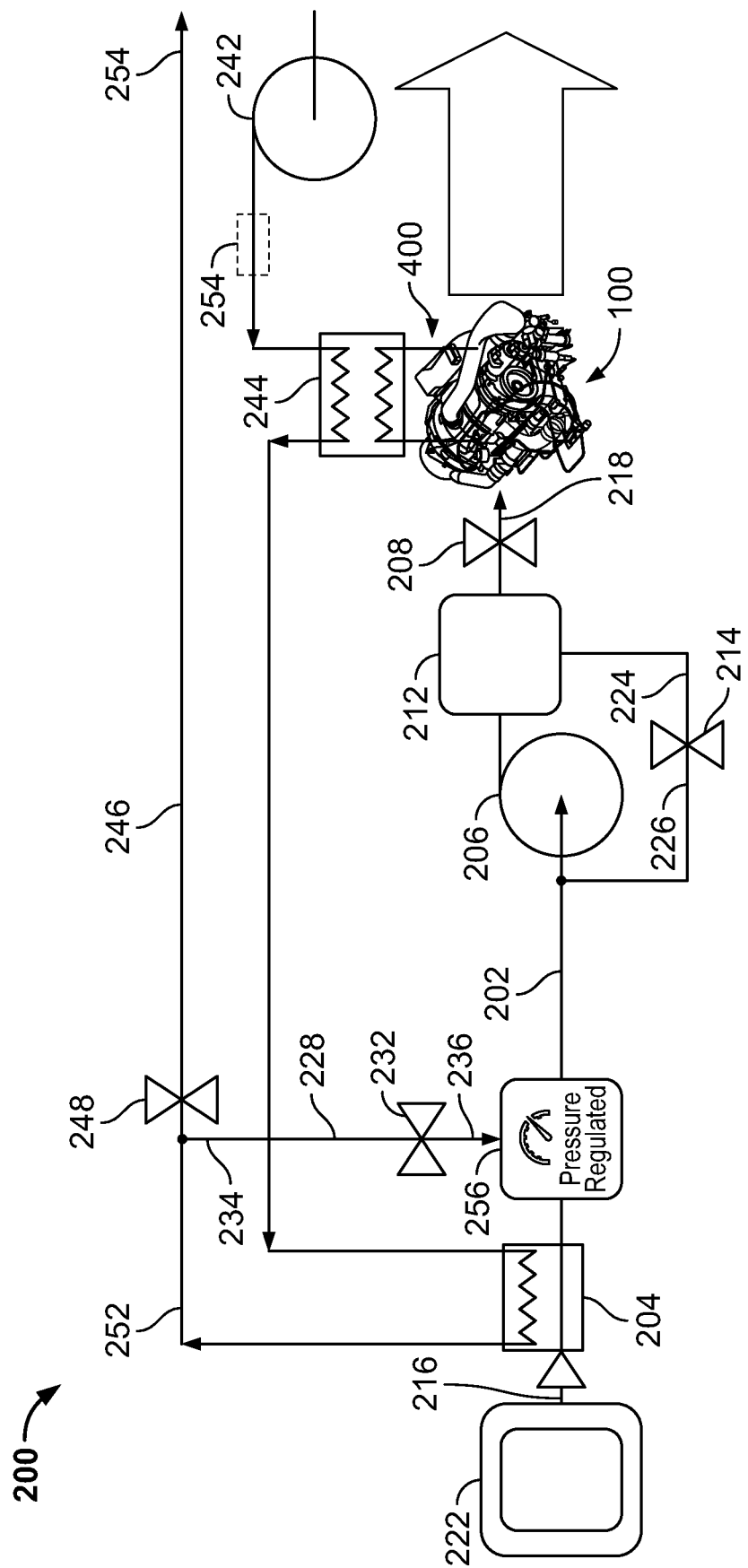
FIG. 4 depicts a functional schematic diagram of another embodiment of a hydrogen supply system that may be used to supply hydrogen to the combustor of the gas turbine engine of FIG. 1.

In another embodiment, which is depicted in FIG. 4, the heat generated in the gas turbine engine 100 is supplied from a cooling loop 400 within the gas turbine engine 100. As FIG. 4 depicts, in this embodiment the engine heat exchanger 244 transfers the heat generated in the gas turbine engine 100 to the air via the cooling loop 400.

Figure 3:
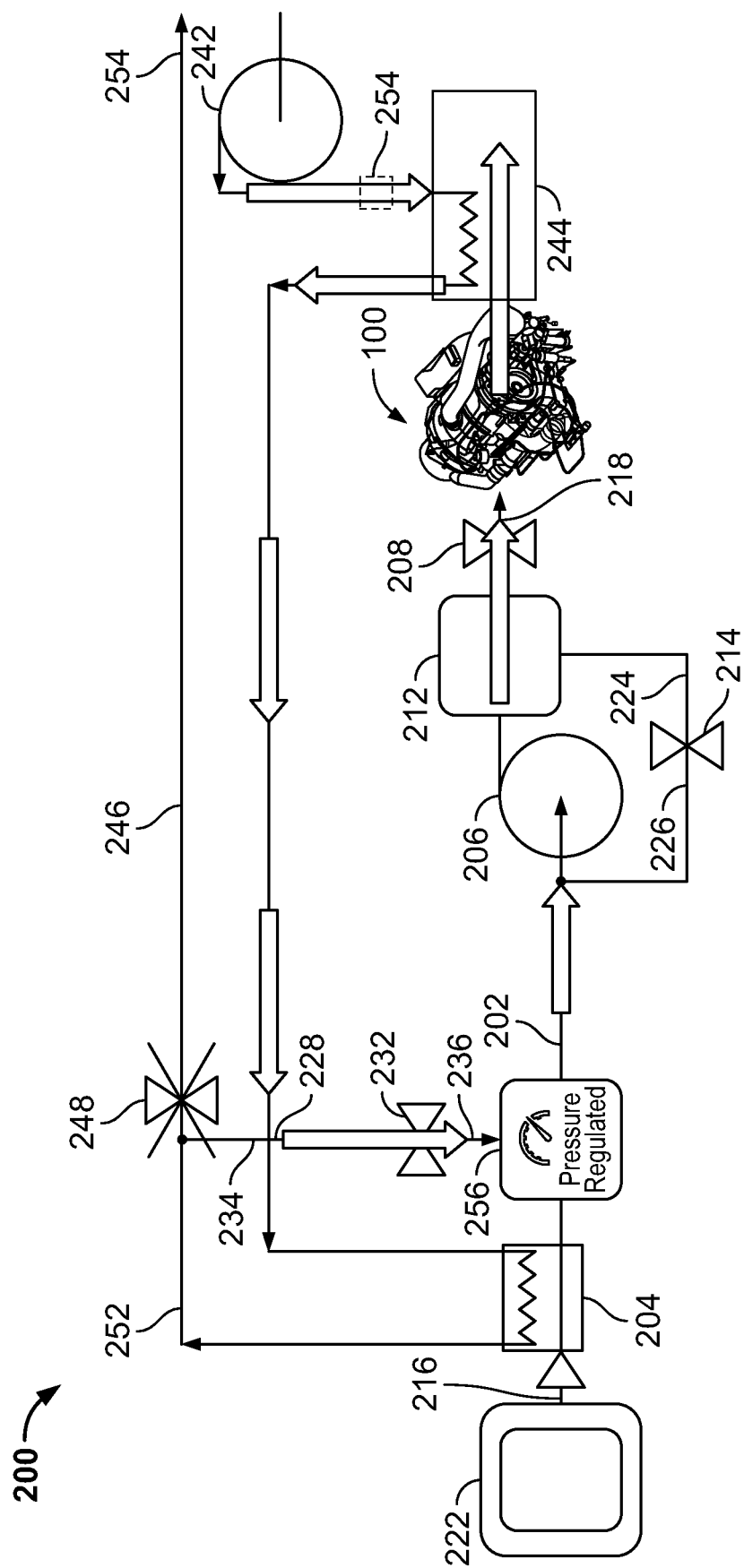
FIG. 3 depicts a functional schematic diagram of the hydrogen supply system of FIG. 2 in a shutdown/hydrogen venting mode.

Before proceeding further, it is noted that in the embodiments depicted in FIGS. 2-4, the system 200 may optionally include a dryer 254. The dryer 254 (depicted with dotted lines), when included, will eliminate water, situated in the vicinity of engine heat exchanger 244, since the airstream could be laden with water that could freeze in the lines.

Figure 5:
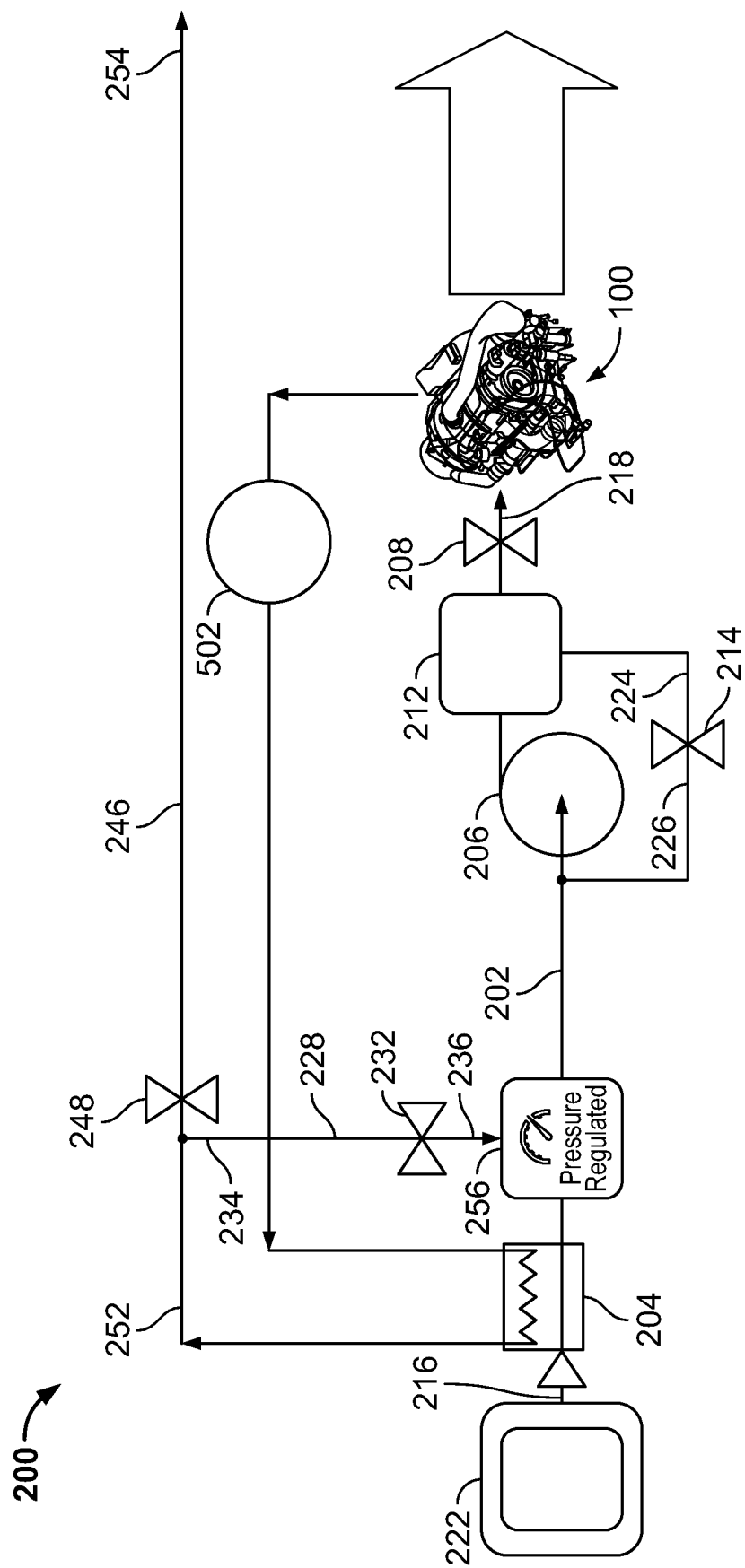
FIG. 5 depicts a functional schematic diagram of yet another embodiment of a hydrogen supply system that may be used to supply hydrogen to the combustor of the gas turbine engine of FIG. 1.

Returning to the description, in yet another embodiment, which is depicted in FIG. 5, the heat source is bleed air that is discharged from the gas turbine engine 100. In this embodiment, the system 200 does not include the air pump 242 since the bleed air from the gas turbine engine 100 is at a pressure sufficient flow of air through the inlet heat exchanger 204. This embodiment does, however, include an accumulator 502 to receive the bleed air discharged from the gas turbine engine 100. The purpose of the accumulator 502 is to store a prescribed volume of compressed air from the gas turbine engine 100 while it is operating at or near the full power condition such that it is available for startup when the gas turbine engine 100 is not yet delivering full pressure.

In each of the described embodiments, the air that is discharged from the inlet heat exchanger 204 (e.g., the previously mentioned pressurized air source) is subsequently discharged from the system 200 either via above-described vent line 228 and purge valve 232 or via an air discharge line 246 and discharge valve 248. Specifically, and as FIGS. 1-4 depict, the air discharge line 246 includes a discharge line inlet 252 and a discharge line outlet 254. The discharge line inlet 252 is in fluid communication with the source of pressurized air and with the vent line inlet 234, and the discharge line outlet 254 is in fluid communication with, for example, the surrounding environment.

The discharge valve 248 is disposed within the air discharge line 246 downstream of the vent line inlet 234 and is moveable between a closed position and a plurality of open positions. In the closed position, the discharge line inlet 252 is fluidly isolated from the discharge line outlet 254. Thus, the air discharged from the pressurized air source is not discharged to the environment. In the open position, the discharge line inlet 252 is in fluid communication with the discharge line outlet 254. Thus, the air discharged from the pressurized air source is discharged to the environment.

It should be noted that during normal operation of the system 200, the discharge valve 248 is in the open position. However, when the system 200 is being shut down, and thus the hydrogen is being purged from the system 200 and gas turbine engine 100, the discharge valve 248 is moved to the closed position. As described above, and as FIG. 2 depicts, during the shutdown the purge valve 232 is moved to the open position.

Finally, as FIGS. 1-4 all depict, each of the embodiments of the hydrogen supply system 200 may additionally include a low-pressure gaseous hydrogen storage tank 256. The low-pressure gaseous hydrogen storage tank 256, when included, is disposed within the hydrogen supply line 202 between the inlet heat exchanger 204 and the pump 206. The low-pressure gaseous hydrogen storage tank 256, when included, may, at least in some embodiments, be pressure regulated.

The systems described herein provide a relatively simple and relatively expensive way to heat/vaporize and compress liquid hydrogen for delivery to a gas turbine engine.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for supplying hydrogen to a combustor of a gas turbine engine, comprising:
   a hydrogen supply line having a liquid hydrogen inlet and a gaseous hydrogen outlet, the liquid hydrogen inlet adapted to receive liquid hydrogen from a liquid hydrogen supply source, the gaseous hydrogen outlet adapted to be coupled to the gas turbine engine;
   an inlet heat exchanger disposed within the hydrogen supply line downstream of the liquid hydrogen inlet, the inlet heat exchanger coupled to receive pressurized air, at a first temperature, from a heat source and configured to (i) transfer heat from the pressurized air to the liquid hydrogen to thereby convert the liquid hydrogen to gaseous hydrogen at a first pressure, (ii) decrease the first temperature to a second temperature, and (iii) discharge the pressurized air at the second temperature;
   a pump disposed within the hydrogen supply line downstream of the inlet heat exchanger, the pump coupled to receive the gaseous hydrogen from the heat exchanger and configured to discharge the gaseous hydrogen at a second pressure that is higher than the first pressure;
   a fuel metering valve disposed within the hydrogen supply line downstream of the pump, the fuel metering valve configured to control a flowrate of the gaseous hydrogen discharged from the pump through the gaseous hydrogen outlet;
   a high-pressure gaseous hydrogen tank disposed within the hydrogen supply line between the pump and the fuel metering valve, the high-pressure gaseous hydrogen tank coupled to receive and store at least a portion of the gaseous hydrogen discharged from the pump;
   a pressure-regulating valve having an inlet and an outlet, the inlet in fluid communication with the high-pressure gaseous hydrogen tank, the outlet in fluid communication with the hydrogen supply line upstream of the pump, the pressure-regulating valve operable to maintain the second pressure at a substantially constant pressure magnitude;
   a vent line having a vent line inlet and a vent line outlet, the vent line inlet coupled to receive, from the inlet heat exchanger, the pressurized air at the second temperature, the vent line outlet in fluid communication with the hydrogen supply line downstream of the inlet heat exchanger; and a purge valve disposed within the vent line and movable between a closed position, in which the vent line inlet is fluidly isolated from the vent line outlet, and an open position, in which the vent line inlet is in fluid communication with the vent line outlet.

2. The system of claim 1, wherein the heat source comprises:

an air pump configured to receive air, at a third first temperature, from a surrounding atmosphere and discharge the air at a discharge pressure; and an engine heat exchanger coupled to receive the pressurized air discharged from the air pump and configured to (i) transfer heat generated in the gas turbine engine to the pressurized air to thereby increase the third temperature to the first temperature and (ii) supply the pressurized air, at the first temperature, to the inlet heat exchanger.

3. The system of claim 2, wherein the heat generated in the gas turbine engine is supplied from engine exhaust gas.

4. The system of claim 2, wherein the heat generated in the gas turbine engine is supplied from a cooling loop within the gas turbine engine.

5. The system of claim 1, wherein the heat source comprises bleed air discharged from the gas turbine engine.

6. The system of claim 5, further comprising:

an accumulator disposed upstream of the inlet heat exchanger and configured to receive the bleed air discharged from the gas turbine engine.

7. The system of claim 1, further comprising:

a gaseous hydrogen storage tank disposed within the hydrogen supply line between the inlet heat exchanger and the pump.

* * * * *

UNITED STATES PATENT AND TRADEMARK OFFICE
CERTIFICATE OF CORRECTION

| | | |
|---|---|---|
| PATENT NO. | : 12,092,032 B1 | Page 1 of 1 |
| APPLICATION NO. | : 18/329041 | |
| DATED | : September 17, 2024 | |
| INVENTOR(S) | : Rodolphe Dudebout | |

It is certified that error appears in the above-identified patent and that said Letters Patent is hereby corrected as shown below:

In the Claims

Column 9, Line 12 Claim 2, delete "first".

Signed and Sealed this
Eleventh Day of February, 2025

Coke Morgan Stewart
*Acting Director of the United States Patent and Trademark Office*